United States Patent
Zhu

(10) Patent No.: US 10,257,020 B2
(45) Date of Patent: Apr. 9, 2019

(54) ALARM PROCESSING METHOD AND APPARATUS

(71) Applicant: ZTE Corporation, Shenzhen (CN)

(72) Inventor: Weihong Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/521,462

(22) PCT Filed: Mar. 30, 2015

(86) PCT No.: PCT/CN2015/075421
§ 371 (c)(1),
(2) Date: Apr. 24, 2017

(87) PCT Pub. No.: WO2016/062011
PCT Pub. Date: Apr. 28, 2016

(65) Prior Publication Data
US 2017/0317872 A1    Nov. 2, 2017

(30) Foreign Application Priority Data
Oct. 24, 2014   (CN) .......................... 2014 1 0579729

(51) Int. Cl.
*H04L 12/24*    (2006.01)
(52) U.S. Cl.
CPC ........ *H04L 41/065* (2013.01); *H04L 41/0618* (2013.01); *H04L 41/0636* (2013.01); *H04L 41/0677* (2013.01); *H04L 41/12* (2013.01); *H04L 41/069* (2013.01)

(58) Field of Classification Search
None
See application file for complete search history.

(56) References Cited

U.S. PATENT DOCUMENTS

| | | | |
|---|---|---|---|
| 6,687,748 B1 | 2/2004 | Zhang | |
| 8,738,972 B1 | 5/2014 | Bakman et al. | |
| 9,460,286 B1 * | 10/2016 | Felstaine | ............. H04L 63/1458 |
| 9,979,602 B1 * | 5/2018 | Chinnakannan | ........ H04L 41/12 |
| 2012/0311475 A1 | 12/2012 | Wong | |
| 2014/0165054 A1 | 6/2014 | Wang et al. | |
| 2016/0224409 A1 * | 8/2016 | Liu | ..................... H04L 41/0654 |

FOREIGN PATENT DOCUMENTS

| | | |
|---|---|---|
| CN | 101582807 A | 11/2009 |
| CN | 104050045 A | 9/2014 |

OTHER PUBLICATIONS

International Search Report for corresponding application PCT/CN2015/075421 filed on Mar. 30, 2015; dated Jul. 20, 2015.
EP Search Report dated Aug. 22, 2017, EP Application No. 15851728.4, 8 pages.

\* cited by examiner

*Primary Examiner* — Hong S Cho
(74) *Attorney, Agent, or Firm* — Cantor Colburn LLP

(57) ABSTRACT

An alarm processing method and an alarm processing apparatus are provided. In the alarm processing method, an alarm reported by a Virtualized Network Function (VNF) is received; VNF Forwarding Graph (VNF FG) information of the VNF and/or Network Forwarding Path (NFP) information of the VNF is acquired; and alarm analysis processing is performed on the received alarm according to the VNF FG information and/or the NFP information acquired.

18 Claims, 6 Drawing Sheets

ALARM PROCESSING METHOD AND APPARATUS

TECHNICAL FIELD

The present disclosure relates to the field of communications, and in particular to an alarm processing method and an alarm processing apparatus.

BACKGROUND

In mobile communication networks, when mobile communication equipment has a failure, corresponding alarm information may be generated, so that operation and administration personnel can learn the occurrence of failure and locate and troubleshoot the failure as soon as possible. The alarm information first is sent by a network element to an Element Management System (EMS) through a south bound interface (Itf-S). If a Network Management System (NMS) subscribes related alarms, when a failure occurs, the alarm information may be reported to the NMS from the EMS through the south bound interface. Sometimes, when a failure occurs, a chain reaction may be caused, a plurality of alarms may be generated synchronously and these alarms generally have correlation with each other. Under such circumstance, analysis may be performed using alarm correlation to find the root alarm, so as to reduce the number of alarms actually reported or to accelerate the location of failure. For traditional mobile communication networks, some methods for alarm correlation are already available. However, in the related methods for alarm correlation, when analysing the correlation between alarms, lots of alarms need to be analyzed, causing low alarm analysis efficiency and slow fault location.

SUMMARY

Some embodiments of the present disclosure provides an alarm processing method and an alarm processing apparatus, to at least solve the problems of low alarm analysis efficiency and slow fault location in the related methods for alarm correlation.

According to one embodiment of the present disclosure, an alarm processing method is provided, which may include the following acts. An alarm reported by a Virtualized Network Function (VNF) is received. VNF Forwarding Graph (VNF FG) information of the VNF and/or Network Forwarding Path (NFP) information of the VNF is acquired. Alarm analysis processing is performed on the received alarm according to the VNF FG information and/or the NFP information acquired.

In an exemplary embodiment, the VNF FG information and/or the NFP information may be acquired through at least one of: acquiring the VNF FG information and/or the NFP information from an Operation Supporting System (OSS); acquiring the VNF FG information and/or the NFP information from a Network Management System (NMS); acquiring the VNF FG information and/or the NFP information from a Network Function Virtualization Orchestrator (NFVO); and acquiring the VNF FG information and/or the NFP information from the received alarm.

In an exemplary embodiment, the VNF FG information may include at least one of: a VNF Forwarding Graph Record Identifier (VNFFGR ID) of a VNF FG containing the VNF; or a position of the VNF in the VNF FG. The NFP information may include at least one of: a Network Forwarding Path Identifier (NFP ID) of an NFP containing the VNF; or a position of the VNF in the NFP.

In an exemplary embodiment, performing alarm analysis processing on the received alarm according to the VNF FG information and/or the NFP information acquired may include at least one of the following acts. It is judged whether an alarm, of which a type is the same as the received alarm and which is reported by one or more other VNFs in the VNF FG except the VNF, is received, and when no alarm, of which the type is the same as the received alarm and which is reported by one or more other VNFs in the VNF FG except the VNF, is received, the received alarm is determined to be a primary alarm. A position of the VNF, which reports the received alarm, in the VNF-FG is compared with a position of a VNF, which reports a previously received primary alarm, in the VNF-FG, and when the position of the VNF, which reports the received alarm, in the VNF-FG is prior to the position of the VNF, which reports the previously received primary alarm, in the VNF-FG, the received alarm is determined to be a primary alarm. A position of the VNF, which reports the received alarm, in the VNF-FG is compared with a position of a VNF, which reports a previously received primary alarm, in the VNF-FG, and when the position of the VNF, which reports the received alarm, in the VNF-FG is after the position of the VNF, which reports the previously received primary alarm, in the VNF-FG, the received alarm is determined to be a secondary alarm. It is judged whether an alarm, of which a type is the same as the received alarm serving as a primary alarm, is received with a preset time, and when no alarm, of which the type is the same as the received alarm serving as the primary alarm, is received with the preset time, the received alarm is determined to be a root alarm. It is judged whether an alarm, of which a type is the same as the received alarm and which is reported by one or more other VNFs in the NFP except the VNF, is received, and when no alarm, of which the type is the same as the received alarm and which is reported by one or more other VNFs in the NFP except the VNF, is received, the received alarm is determined to be a primary alarm. A position of the VNF, which reports the received alarm, in the NFP is compared with a position of a VNF, which reports a previously received primary alarm, in the NFP, and when the position of the VNF, which reports the received alarm, in the NFP is prior to the position of the VNF, which reports the previously received primary alarm, in the NFP, the received alarm is determined to be a primary alarm. A position of the VNF, which reports the received alarm, in the NFP is compared with a position of a VNF, which reports a previously received primary alarm, in the NFP, and when the position of the VNF, which reports the received alarm, in the NFP is after the position of the VNF, which reports the previously received primary alarm, in the NFP, the received alarm is determined to be a secondary alarm. It is judged whether an alarm, of which a type is the same as the received alarm serving as a primary alarm, is received with a preset time, and when no alarm, of which the type is the same as the received alarm serving as the primary alarm, is received with the preset time, the received alarm is determined to be a root alarm.

In an exemplary embodiment, after performing alarm analysis processing on the received alarm according to the VNF FG information and/or the NFP information acquired, when the received alarm is determined to be a root alarm, the alarm processing method may further include the following act. The alarm is processed by at least one of: reporting the alarm; displaying the alarm by a preset way; starting a related troubleshooting process; and adding the alarm to a vertical alarm correlation process.

According to another embodiment of the present disclosure, an alarm processing apparatus is provided, including a receiving module, an acquisition module and a first processing module. The receiving module is arranged to receive an alarm reported by a VNF. The acquisition module is arranged to acquire VNF FG information of the VNF and/or NFP information of the VNF. The first processing module is arranged to perform alarm analysis processing on the received alarm according to the VNF FG information and/or the NFP information acquired.

In an exemplary embodiment, the acquisition module may be further arranged to acquire the VNF FG information and/or the NFP information through at least one of: acquiring the VNF FG information and/or the NFP information from an OSS; acquiring the VNF FG information and/or the NFP information from an NMS; acquiring the VNF FG information and/or the NFP information from an NFVO; and acquiring the VNF FG information and/or the NFP information from the received alarm.

In an exemplary embodiment, the VNF FG information may include at least one of: a VNFFGR ID of a VNF FG containing the VNF; or a position of the VNF in the VNF FG The NFP information may include at least one of: an NFP ID of an NFP containing the VNF; or a position of the VNF in the NFP.

In an exemplary embodiment, the first processing module may include at least one of the following units. A first determination unit is arranged to judge whether an alarm, of which a type is the same as the received alarm and which is reported by one or more other VNFs in the VNF FG except the VNF, is received, and when no alarm, of which the type is the same as the received alarm and which is reported by one or more other VNFs in the VNF FG except the VNF, is received, determine the received alarm to be a primary alarm. A second determination unit is arranged to compare a position of the VNF, which reports the received alarm, in the VNF-FG with a position of a VNF, which reports a previously received primary alarm, in the VNF-FG, and when the position of the VNF, which reports the received alarm, in the VNF-FG is prior to the position of the VNF, which reports the previously received primary alarm, in the VNF-FG, determine the received alarm to be a primary alarm. A third determination unit is arranged to compare a position of the VNF, which reports the received alarm, in the VNF-FG with a position of a VNF, which reports a previously received primary alarm, in the VNF-FG, and when the position of the VNF, which reports the received alarm, in the VNF-FG is after the position of the VNF, which reports the previously received primary alarm, in the VNF-FG, determine the received alarm to be a secondary alarm. A fourth determination unit is arranged to judge whether an alarm, of which a type is the same as the received alarm serving as a primary alarm, is received with a preset time, and when no alarm, of which the type is the same as the received alarm serving as the primary alarm, is received with the preset time, determine the received alarm to be a root alarm. A fifth determination unit is arranged to judge whether an alarm, of which a type is the same as the received alarm and which is reported by one or more other VNFs in the NFP except the VNF, is received, and when no alarm, of which the type is the same as the received alarm and which is reported by one or more other VNFs in the NFP except the VNF, is received, determine the received alarm to be a primary alarm. A sixth determination unit is arranged to compare a position of the VNF, which reports the received alarm, in the NFP with a position of a VNF, which reports a previously received primary alarm, in the NFP, and when the position of the VNF, which reports the received alarm, in the NFP is prior to the position of the VNF, which reports the previously received primary alarm, in the NFP, determine the received alarm to be a primary alarm. A seventh determination unit is arranged to compare a position of the VNF, which reports the received alarm, in the NFP with a position of a VNF, which reports a previously received primary alarm, in the NFP, and when the position of the VNF, which reports the received alarm, in the NFP is after the position of the VNF, which reports the previously received primary alarm, in the NFP, determine the received alarm to be a secondary alarm. An eighth determination unit is arranged to judge whether an alarm, of which a type is the same as the received alarm serving as a primary alarm, is received with a preset time, and when no alarm, of which the type is the same as the received alarm serving as the primary alarm, is received with the preset time, determine the received alarm to be a root alarm.

In an exemplary embodiment, the alarm processing apparatus may further include a second processing module. The second processing module is arranged to process the received alarm which is determined to be a root alarm by at least one of: reporting the alarm; displaying the alarm by a preset way; starting a related troubleshooting process; and adding the alarm to a vertical alarm correlation process.

By virtue of the technical scheme, an alarm reported by a VNF is received, VNF FG information and/or the NFP information of the VNF is acquired, and alarm analysis is performed on the received alarm according to the VNF FG information and/or the NFP information acquired. The problems of low alarm analysis efficiency and slow fault location in the related methods for alarm correlation are solved, and the effects of improving alarm analysis efficiency and fast fault location are achieved.

BRIEF DESCRIPTION OF THE DRAWINGS

For a better understanding of the present disclosure, accompanying drawings described hereinafter are provided to constitute one part of the application. In the accompanying drawings.

DETAILED DESCRIPTION OF THE EMBODIMENTS

The present disclosure is described below in detail by reference to the accompanying drawings in conjunction with embodiments. It should be noted that the embodiments in the application and the characteristics of the embodiments can be combined if no conflict is caused.

Figure 1:
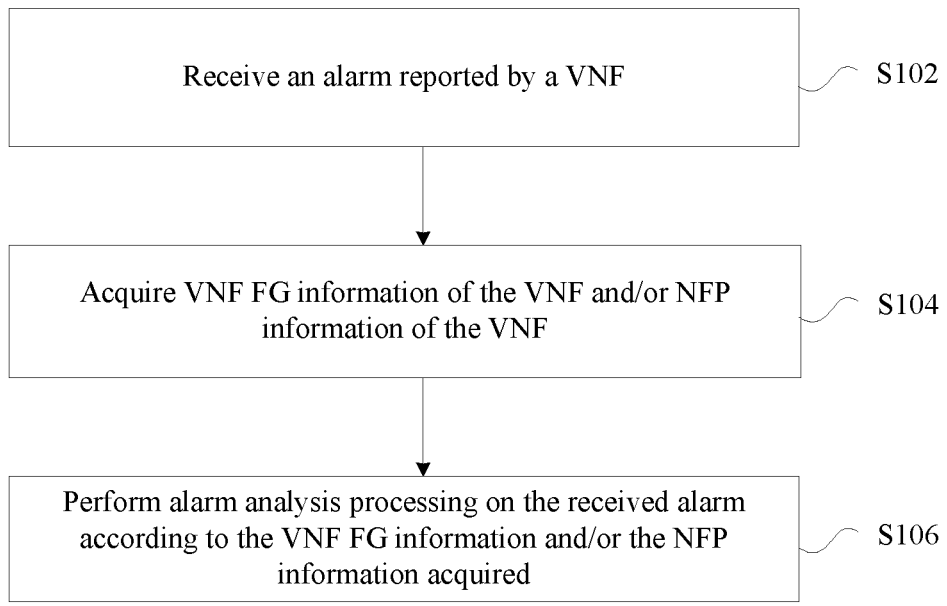
FIG. 1 is a flowchart of an alarm processing method according to an embodiment of the present disclosure.

An alarm processing method is provided in an embodiment. FIG. 1 is a flowchart of an alarm processing method according to the embodiment of the present disclosure. As shown in FIG. 1, the process may include the following acts S102 to S106.

At act S102, an alarm reported by a VNF is received.

At act S104, VNF FG information of the VNF and/or NFP information of the VNF is acquired.

At act S106, alarm analysis processing is performed on the received alarm according to the VNF FG information and/or the NFP information acquired.

Through the above acts, alarm analysis is performed on the received alarm according to the VNF FG information and/or the NFP information acquired. The above VNF FG information of the VNF and/or the NFP information to some extent clearly reflect the structure between VNFs in alarm correlation. Therefore, by virtue of the technical scheme, the problems of low alarm analysis efficiency and slow fault location in the related methods for alarm correlation are solved, and the effects of improving alarm analysis efficiency and fast fault location are achieved.

The above VNF FG information and/or NFP information may be acquired by many ways. For example, the VNF FG information and/or the NFP information may be acquired through at least one of: acquiring the VNF FG information and/or the NFP information from an OSS; acquiring the VNF FG information and/or the NFP information from an NFVO; and acquiring the VNF FG information and/or the NFP information from the received alarm.

Herein, the VNF FG information may include at least one of: a VNFFGR ID of a VNF FG containing the VNF; or a position of the VNF in the VNF FG The NFP information may include at least one of: an NFP ID of an NFP containing the VNF; or a position of the VNF in the NFP.

In an exemplary embodiment, alarm analysis processing may be performed on the received alarm according to the VNF FG information and/or the NFP information acquired in many ways. For example, at least one of the following ways may be adopted. It is judged whether an alarm, of which a type is the same as the received alarm and which is reported by one or more other VNFs in the VNF FG except the VNF, is received, and when no alarm, of which the type is the same as the received alarm and which is reported by one or more other VNFs in the VNF FG except the VNF, is received, the received alarm is determined to be a primary alarm. A position of the VNF, which reports the received alarm, in the VNF-FG is compared with a position of a VNF, which reports a previously received primary alarm, in the VNF-FG, and when the position of the VNF, which reports the received alarm, in the VNF-FG is prior to the position of the VNF, which reports the previously received primary alarm, in the VNF-FG, the received alarm is determined to be a primary alarm. A position of the VNF, which reports the received alarm, in the VNF-FG is compared with a position of a VNF, which reports a previously received primary alarm, in the VNF-FG, and when the position of the VNF, which reports the received alarm, in the VNF-FG is after the position of the VNF, which reports the previously received primary alarm, in the VNF-FG, the received alarm is determined to be a secondary alarm. It is judged whether an alarm, of which a type is the same as the received alarm serving as a primary alarm, is received with a preset time, and when no alarm, of which the type is the same as the received alarm serving as the primary alarm, is received with the preset time, the received alarm is determined to be a root alarm. It is judged whether an alarm, of which a type is the same as the received alarm and which is reported by one or more other VNFs in the NFP except the VNF, is received, and when no alarm, of which the type is the same as the received alarm and which is reported by one or more other VNFs in the NFP except the VNF, is received, the received alarm is determined to be a primary alarm. A position of the VNF, which reports the received alarm, in the NFP is compared with a position of a VNF, which reports a previously received primary alarm, in the NFP, and when the position of the VNF, which reports the received alarm, in the NFP is prior to the position of the VNF, which reports the previously received primary alarm, in the NFP, the received alarm is determined to be a primary alarm. A position of the VNF, which reports the received alarm, in the NFP is compared with a position of a VNF, which reports a previously received primary alarm, in the NFP, and when the position of the VNF, which reports the received alarm, in the NFP is after the position of the VNF, which reports the previously received primary alarm, in the NFP, the received alarm is determined to be a secondary alarm. It is judged whether an alarm, of which a type is the same as the received alarm serving as a primary alarm, is received with a preset time, and when no alarm, of which the type is the same as the received alarm serving as the primary alarm, is received with the preset time, the received alarm is determined to be a root alarm.

In an exemplary embodiment, after performing alarm analysis processing on the received alarm according to the VNF FG information and/or the NFP information acquired, when the received alarm is determined to be a root alarm, the alarm processing method may further include the following act. The alarm is processed by at least one of: reporting the alarm; displaying the alarm by a preset way; starting a related troubleshooting process; and adding the alarm to a vertical alarm correlation process.

An alarm processing apparatus is provided in another embodiment. This apparatus is arranged to implement the above embodiments and exemplary embodiments, what described above is not repeated below. Term "module" used below can realize the combination of software and/or hardware with preset functions. Although the alarm processing apparatus described in the following embodiments preferably is implemented in the form of software, the implementation in the form of hardware or the combination of software and hardware is possible and conceived.

Figure 2:
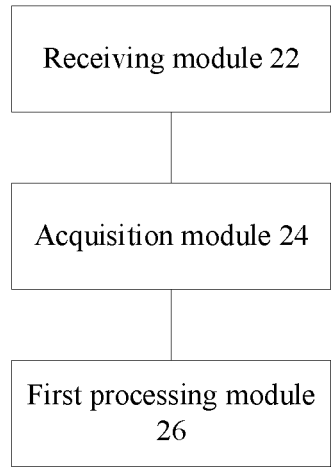
FIG. 2 is a structure diagram of an alarm processing apparatus according to an embodiment of the present disclosure.

FIG. 2 is a structure diagram of an alarm processing apparatus according to the embodiment of the present disclosure. As shown in FIG. 2, the alarm processing apparatus may include: a receiving module 22, an acquisition module 24 and a first processing module 26; the alarm processing apparatus is described below.

The receiving module 22 is arranged to receive an alarm reported by a VNF. The acquisition module 24 is coupled to the above receiving module 22 and is arranged to acquire VNF FG information of the VNF and/or NFP information of the VNF. The first processing module 26 is coupled to the above acquisition module 24 and is arranged to perform alarm analysis processing on the received alarm according to the VNF FG information and/or the NFP information acquired.

The acquisition module 24 may be further arranged to acquire the VNF FG information and/or the NFP information through at least one of: acquiring the VNF FG information and/or the NFP information from an OSS; acquiring the VNF FG information and/or the NFP information from an NFVO; and acquiring the VNF FG information and/or the NFP information from the received alarm.

Herein, the VNF FG information may include at least one of: a VNFFGR ID of a VNF FG containing the VNF; or a position of the VNF in the VNF FG The NFP information may include at least one of: an NFP ID of an NFP containing the VNF; or a position of the VNF in the NFP.

Figure 3:
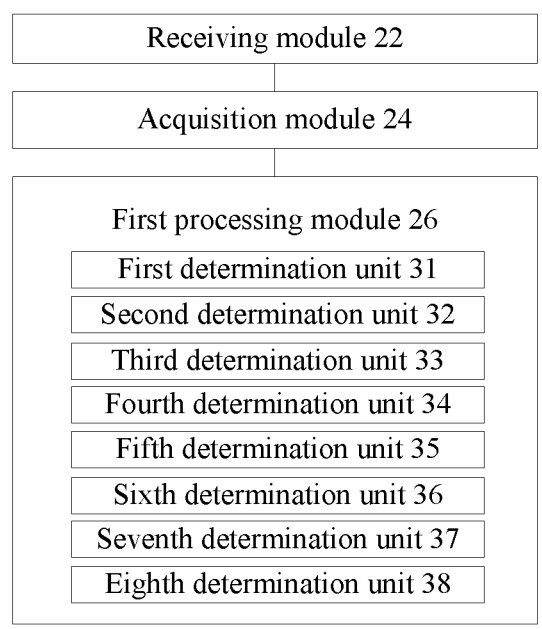
FIG. 3 is an exemplary structure diagram of a first processing module 26 in an alarm processing apparatus according to an embodiment of the present disclosure.

FIG. 3 is an exemplary structure diagram of a first processing module 26 in an alarm processing apparatus according to the embodiment of the present disclosure. As shown in FIG. 3, the first processing module 26 may include at least one of: a first determination unit 31, a second determination unit 32, a third determination unit 33, a fourth determination unit 34, a fifth determination unit 35, a sixth determination unit 36, a seventh determination unit 37 and an eighth determination unit 38; the first processing module 26 is described below.

The first determination unit 31 is arranged to judge whether an alarm, of which a type is the same as the received alarm and which is reported by one or more other VNFs in the VNF FG except the VNF, is received, and when no alarm, of which the type is the same as the received alarm and which is reported by one or more other VNFs in the VNF FG except the VNF, is received, determine the received alarm to be a primary alarm. The second determination unit 32 is arranged to compare a position of the VNF, which reports the received alarm, in the VNF-FG with a position of a VNF, which reports a previously received primary alarm, in the VNF-FG, and when the position of the VNF, which reports the received alarm, in the VNF-FG is prior to the position of the VNF, which reports the previously received primary alarm, in the VNF-FG, determine the received alarm to be a primary alarm. The third determination unit 33 is arranged to compare a position of the VNF, which reports the received alarm, in the VNF-FG with a position of a VNF, which reports a previously received primary alarm, in the VNF-FG, and when the position of the VNF, which reports the received alarm, in the VNF-FG is after the position of the VNF, which reports the previously received primary alarm, in the VNF-FG, determine the received alarm to be a secondary alarm. The fourth determination unit 34 is arranged to judge whether an alarm, of which a type is the same as the received alarm serving as a primary alarm, is received with a preset time, and when no alarm, of which the type is the same as the received alarm serving as the primary alarm, is received with the preset time, determine the received alarm to be a root alarm. The fifth determination unit 35 is arranged to judge whether an alarm, of which a type is the same as the received alarm and which is reported by one or more other VNFs in the NFP except the VNF, is received, and when no alarm, of which the type is the same as the received alarm and which is reported by one or more other VNFs in the NFP except the VNF, is received, determine the received alarm to be a primary alarm. The sixth determination unit 36 is arranged to compare a position of the VNF, which reports the received alarm, in the NFP with a position of a VNF, which reports a previously received primary alarm, in the NFP, and when the position of the VNF, which reports the received alarm, in the NFP is prior to the position of the VNF, which reports the previously received primary alarm, in the NFP, determine the received alarm to be a primary alarm. The seventh determination unit 37 is arranged to compare a position of the VNF, which reports the received alarm, in the NFP with a position of a VNF, which reports a previously received primary alarm, in the NFP, and when the position of the VNF, which reports the received alarm, in the NFP is after the position of the VNF, which reports the previously received primary alarm, in the NFP, determine the received alarm to be a secondary alarm. The eighth determination unit 38 is arranged to judge whether an alarm, of which a type is the same as the received alarm serving as a primary alarm, is received with a preset time, and when no alarm, of which the type is the same as the received alarm serving as the primary alarm, is received with the preset time, determine the received alarm to be a root alarm.

Figure 4:
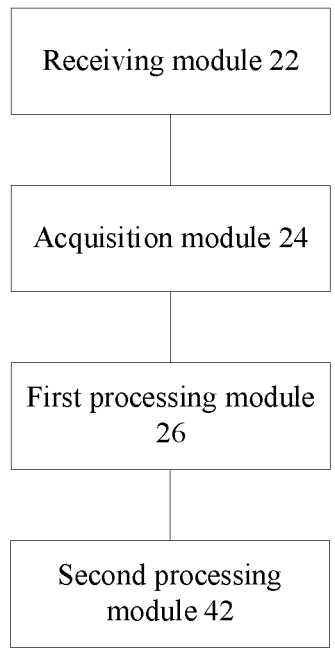
FIG. 4 is an exemplary structure diagram of an alarm processing apparatus according to an embodiment of the present disclosure.

FIG. 4 is an exemplary structure diagram of an alarm processing apparatus according to the embodiment of the present disclosure. As shown in FIG. 4, this structure may further include a second processing module 42 besides the structure shown in FIG. 2. The alarm processing apparatus is described below.

The second processing module 42 is coupled to the first processing module 26 and is arranged to process the received alarm which is determined to be a root alarm by at least one of: reporting the alarm; displaying the alarm by a preset way; starting a related troubleshooting process; and adding the alarm to a vertical alarm correlation process.

As the development and application of network virtualization technologies, some equipment in mobile communication networks also adopts virtualization technologies, so that original physical equipment is replaced by a VNF. After virtualized equipment is applied, the alarm correlation condition in mobile communication network also changes. Some new information may also be used to realize new alarm correlation methods. For example, after network functions are virtualized, when VNFs are used to compose a network service, a VNF FG is adopted to determine in which order or connection mode each VNF realizes the corresponding network service. The FG contains the correlation relationship between respective VNFs, and the correlation relationship may also be used for alarm correlation analysis.

Thus, in this embodiment, a method for performing alarm correlation analysis using a VNF FG is provided, which achieves, by using the information of the VNF FG during the alarm correlation analysis, the objective of reducing the number of alarms or accelerating fault location through the alarm correlation analysis in a virtualization environment.

It should be noted that, in a virtualization network, when a plurality of VNFs are used to compose a Network Service (NS), it may be needed to define the mutual relationship between each VNF. That is, information transmitting path may be provided between each VNF in order to provide a network service meeting requirements, and the information transmitting path may be expressed through a VNF FG Therefore, all VNFs in the same VNF FG provide services for the same NS, and the service orders of the VNFs vary depending on the positions of the VNFs in the VNF FG When one of the VNFs composing one NS has a failure, impact probably may be caused to the normal operation of one or more VNFs in subsequent positions in the VNF FG. Therefore, besides the VNF having a failure, one or more VNFs in subsequent positions probably will generate an alarm for the same failure. Under such circumstance, alarm correlation analysis may be performed according to the VNF FG information to determine the root of the alarm. In this way, only the root alarm is reported or processed, and other correlated alarms may be neglected.

Descriptions are provided below for the method for performing alarm analysis according to the VNF FG information and the NFP information respectively.

A method for performing alarm analysis according to the VNF FG information may include the following acts. When receiving an alarm reported by a VNF, the VNF FG information related to the VNF is acquired. According to the VNF FG information related to the VNF, correlation analysis is performed on the alarm so as to determine whether the alarm is a primary alarm/root alarm or a secondary alarm, thereby deciding whether to perform subsequent processing.

Herein, the VNF FG information related to the VNF may be acquired in many ways. For example, the VNF FG information related to the VNF may be acquired in at least one of the following ways: acquiring from an OSS; acquiring from an NMS; acquiring from an NFVO; and acquiring from the received alarm.

In the VNF FG information related to the VNF acquired above, the VNF FG information may include but not limited to one or more of the following parameters: a VNFFGR ID of a VNF FG containing the VNF; or a position of the VNF in the VNF FG.

Correlation analysis may be performed on the alarm in the following manner so as to determine whether the alarm is a primary alarm/root alarm or a secondary alarm.

According to the VNFFGR ID of the VNF FG containing the VNF reporting the alarm, it is judged whether a same type alarm or a function related alarm reported by other VNFs in the VNF FG has been received.

If the same type alarm or the function related alarm reported by other VNFs in the VNF FG has not been received yet, the alarm is temporarily determined to be a primary alarm. If the same type alarm or the function related alarm reported by other VNFs in the VNF FG has been received, the position of the VNF reporting the alarm in the VNF FG is compared with the position of the VNF reporting the previously received primary alarm in the VNF FG.

If the position of the VNF reporting the alarm is prior to the position of the VNF reporting the previously received primary alarm, it is indicated that the alarm is a primary alarm, and the previously received primary alarm is changed to a non-primary alarm.

If the position of the VNF reporting the alarm is after the position of the VNF reporting the previously received primary alarm, it is indicated that the alarm is not a primary alarm.

The following three notes may be paid attention to. Note 1: When a root alarm needs to be reported, the received alarms probably need to be cached before the root alarm is determined. After a period of time (which may be determined by the alarm cache time threshold), if there is no other same type alarm or function related alarm reported, the current primary alarm is determined to be a root alarm.

Note 2: The root alarm mentioned above refers to the root alarm on the VNF layer (horizontal layer), when the alarm on the VNF layer involves an underlayer equipment failure, a root alarm of the underlayer physical equipment may exist. This embodiment involves the finding of the primary alarm or root alarm on the VNF layer. In order to further find the underlayer root alarm, vertical alarm correlation may be further conducted.

Note 3: The position relationship of the VNFs in the VNF FG mentioned above, i.e., whether a VNF is prior to or after another VNF, may be determined when the VNF FG is defined.

The subsequent processing mentioned above may include but not limited to one or more of: reporting the alarm; displaying the alarm or by a special way; starting a related troubleshooting process; and adding the alarm to a vertical alarm correlation process.

In addition, a functional module for executing the above method may be located on an EMS (each VNF belongs to the same manufacturer), a VNF Manager (VNFM), an NFVO or an NMS/OSS, etc., and may be generally embodied as an alarm processing module, or an alarm correlation and root alarm locating module, etc.

A method for performing alarm analysis according to the NFP information may include the following acts. When an alarm reported by a VNF is received, the NFP information related to the VNF may also be acquired. The alarm processing method may include the following processes. When receiving an alarm reported by a VNF, the NFP information related to the VNF is acquired. According to the NFP information related to the VNF, correlation analysis is performed on the alarm so as to determine whether the alarm is a primary alarm or a root alarm, thereby deciding whether to perform subsequent processing.

The NFP information related to the VNF may be acquired in many ways. For example, the NFP information related to the VNF may be acquired in but not limited to one of the following ways: acquiring from an OSS or an NFVO; or acquiring from the received alarm. Herein, in the NFP information acquired above, the NFP information may include but not limited to one or more of the following parameters: a network_forwarding_path ID of a NFP containing the VNF; or a position of the VNF in the NFP.

Correlation analysis may be performed on the alarm in the following manner so as to determine whether the alarm is a primary alarm/root alarm or a secondary alarm.

According to the network_forwarding_path ID of the NFP containing the VNF reporting the alarm, it is judged whether a same type alarm or a function related alarm reported by other VNFs in the NFP has been received.

If the same type alarm or the function related alarm reported by other VNFs in the NFP has not been received yet, the alarm is temporarily determined to be a primary alarm. If the same type alarm or the function related alarm reported by other VNFs in the NFP has been received, the position of the VNF reporting the alarm in the NFP is compared with the position of the VNF reporting the previously received primary alarm in the NFP.

If the position of the VNF reporting the alarm is prior to the position of the VNF reporting the previously received primary alarm, it is indicated that the alarm is a primary alarm, and the previously received primary alarm is changed to a non-primary or non-root alarm.

If the position of the VNF reporting the alarm is after the position of the VNF reporting the previously received primary alarm, it is indicated that the alarm is not a primary or root alarm.

The following three notes may be paid attention to. Note 1: When a root alarm needs to be reported, the received alarms probably need to be cached before the root alarm is determined. After a period of time (which may be determined by the alarm cache time threshold), if there is no other same type alarm or function related alarm reported, the current primary alarm is determined to be a root alarm.

Note 2: The root alarm mentioned here refers to the root alarm on the VNF layer (horizontal layer), when the alarm on the VNF layer involves an underlayer equipment failure, a root alarm of the underlayer physical equipment may exist. This embodiment involves the finding of the primary alarm or root alarm on the VNF layer. In order to further find the underlayer root alarm, vertical alarm correlation may be further conducted.

Note 3: The position relationship of the VNFs in the NFP mentioned above, i.e., whether a VNF is prior to or after another VNF, may be determined when the NFP is defined.

The subsequent processing mentioned above may include but not limited to one or more of: reporting the alarm; displaying the alarm or by a special way; starting a related troubleshooting process; and adding the alarm to a vertical alarm correlation process.

It should be noted that a functional module for executing the above method may be located on an EMS (each VNF belongs to the same manufacturer), a VNFM, an NFVO or an NMS/OSS, etc., and may be generally embodied as an alarm processing module, or an alarm correlation and root alarm locating module, etc.

In this embodiment, an alarm correlation and root alarm location device including one or more VNFs is further provided. One or more VNFs together may provide a network service. When one VNF has a failure, a corresponding alarm may be generated.

The alarm correlation and root alarm location device may be located on an NMS/OSS or NFVO, and may alternatively be located on an EMS or VNFM. The alarm correlation and root alarm location device may exist independently. The alarm correlation and root alarm location device may alternatively be merged with an alarm processing module, and may be arranged to execute the alarm correlation and root alarm location function.

Through the above embodiments and exemplary embodiments, alarm correlation analysis is achieved using the VNF FG. That is, in a virtualization environment, the number of alarms can be reduced or fault position can be accelerated by using the information of the VNF FG during the alarm correlation analysis.

The exemplary embodiments of the present disclosure are described below in conjunction with the drawings.

First Exemplary Embodiment

Figure 5:
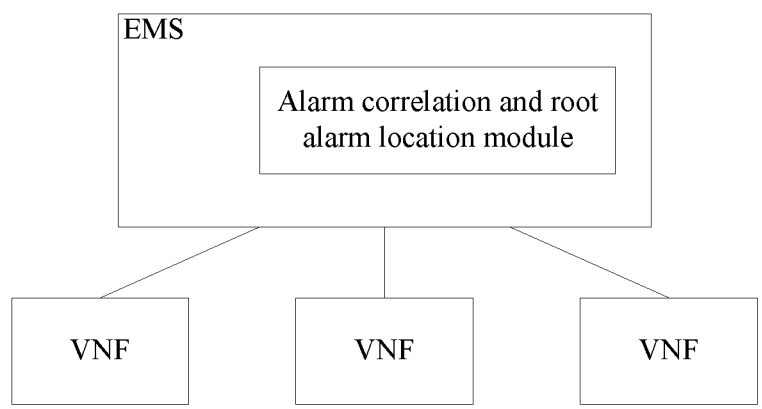
FIG. 5 is a structure diagram of an alarm correlation and root alarm location device according to a first exemplary embodiment of the present disclosure.

FIG. 5 is a structure diagram of an alarm correlation and root alarm location device according to a first exemplary embodiment of the present disclosure. As shown in FIG. 5, the structure may include one or more VNFs and an alarm correlation and root alarm location module.

One or more VNFs together may provide certain network service. When one VNF has a failure, a corresponding alarm may be generated.

The alarm correlation and root alarm location module is located on an EMS and is arranged to execute the alarm correlation and root alarm location function.

VNFs here may be from the same manufacturer.

Corresponding to this device, the alarm correlation and root alarm location process may be arranged to execute the following acts.

When a VNF has a failure, an alarm is reported to the EMS, the reported alarm information containing the VNFFGR ID information of a VNF FG containing the VNF and the position information of the VNF in the VNF FG (for example, the sequence number of the VNF in the VNF FG).

The alarm correlation and root alarm location module located on the EMS performs correlation analysis on the received alarm.

The VNFFGR ID information of the VNF FG containing the VNF reporting the alarm and the position information of the VNF in the VNF FG are acquired from the alarm information.

According to the VNFFGR ID information of the VNF FG containing the VNF, it is judged whether a same type alarm or a function related alarm reported by other VNFs in the VNF FG has been received.

If other alarms have not been received yet, the alarm is temporarily determined to be a primary alarm. If other alarms have been received, the position of the VNF reporting the alarm in the VNF FG is compared with the position of the VNF reporting the previously received alarm in the VNF FG.

If the position of the VNF reporting the alarm is prior to the position of the VNF reporting the previously received alarm, it is indicated that the alarm is a primary alarm, the alarm is marked as a primary alarm and the previously received alarm is marked as a secondary alarm.

If the position of the VNF reporting the alarm is after the position of the VNF reporting the previously received alarm, it is indicated that the alarm is not a primary alarm, the alarm is marked as a secondary alarm, and the mark of the previously received alarm is kept unchanged.

The EMS changes the display mode of related alarms according to the analysis result.

The EMS is suggested to have a storage space to cache all the received alarms. If the previously received alarm is marked as a primary alarm, after a time interval passes since the alarm is received, if the primary alarm mark has not been changed because of the reporting of other alarms, the alarm is marked as a root alarm and is reported to the upper-layer network management system.

Second Exemplary Embodiment

Figure 6:
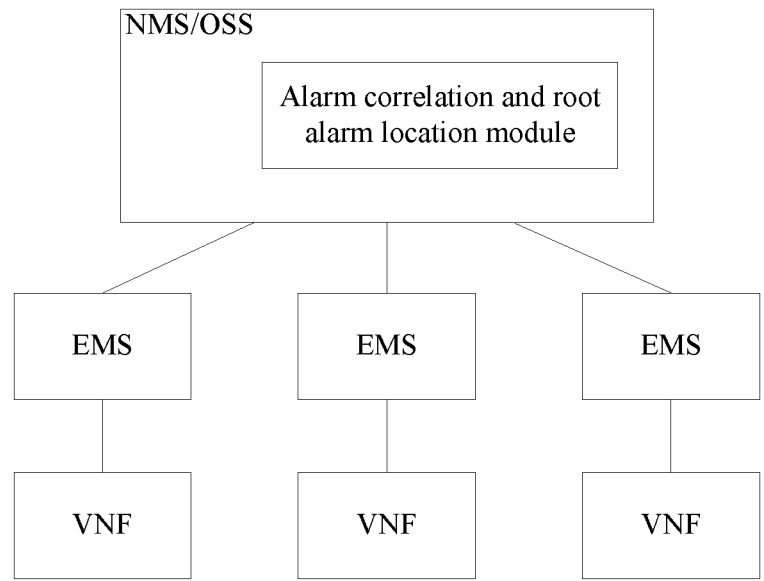
FIG. 6 is a structure diagram of an alarm correlation and root alarm location device according to a second exemplary embodiment of the present disclosure.

FIG. 6 is a structure diagram of an alarm correlation and root alarm location device according to a second exemplary embodiment of the present disclosure. As shown in FIG. 6, the structure may include one or more VNFs, one or more EMSs and an alarm correlation and root alarm location module.

One or more VNFs together may provide certain network service. When one VNF has a failure, a corresponding alarm may be generated.

The EMS manages the VNF provided by each manufacturer, and forwards the alarm reported by the managed VNF to an NMS/OSS.

The alarm correlation and root alarm location module is located on the NMS/OSS and is arranged to execute the alarm correlation and root alarm location function.

VNFs here may be from different manufacturers.

Corresponding to this device, the alarm correlation and root alarm location process may be arranged to execute the following acts.

When a VNF has a failure, an alarm is reported to the NMS/OSS through the EMS, the reported alarm information containing the network_forwarding_path ID information of a Network Forwarding Graph (NFG) containing the VNF and the position of the VNF on the NFG (for example, the sequence number of the VNF on the NFG).

The alarm correlation and root alarm location module located on the NMS/OSS performs correlation analysis on the received alarm.

The network_forwarding_path ID information of the NFG containing the VNF reporting the alarm and the position information of the VNF on the NFG are acquired from the alarm information.

According to the network_forwarding_path ID information of the NFG containing the VNF, it is judged whether a same type alarm or a function related alarm reported by other VNFs on the NFG has been received.

If other alarms have not been received yet, the alarm is temporarily determined to be a primary alarm. If other alarms have been received, the position of the VNF reporting the alarm in the NFG is compared with the position of the VNF reporting the previously received alarm in the NFG.

If the position of the VNF reporting the alarm is prior to the position of the VNF reporting the previously received alarm, it is indicated that the alarm is a primary alarm, the alarm is marked as a primary alarm and the previously received primary alarm is marked as a secondary alarm.

If the position of the VNF reporting the alarm is after the position of the VNF reporting the previously received alarm, it is indicated that the alarm is not a primary alarm, and the alarm is marked as a secondary alarm.

The NMS/OSS changes the display mode of related alarms according to the analysis result.

If the received alarm is marked as a primary alarm, after a time interval passes since the alarm is received, if the primary alarm mark has not been changed because of the reporting of other alarms, the alarm is marked as a root alarm, then the NMS/OSS may start a related alarm troubleshooting process to trouble shoot the alarm or start a corresponding vertical correlation analysis process.

Third Exemplary Embodiment

Figure 7:
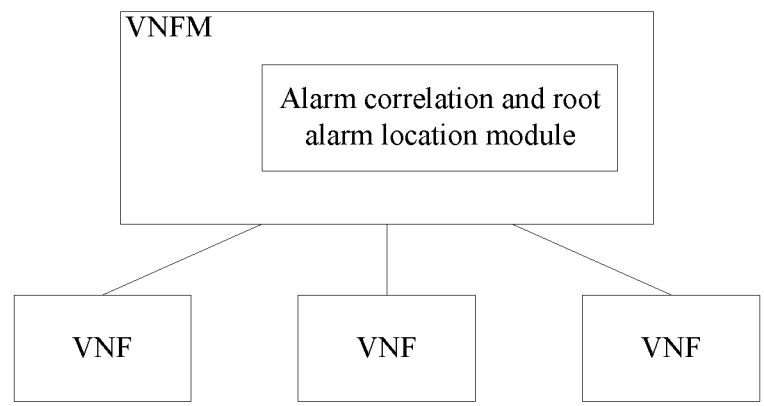
FIG. 7 is a structure diagram of an alarm correlation and root alarm location device according to a third exemplary embodiment of the present disclosure.

FIG. 7 is a structure diagram of an alarm correlation and root alarm location device according to a third exemplary embodiment of the present disclosure. As shown in FIG. 7, the structure may include one or more VNFs and an alarm correlation and root alarm location module.

One or more VNFs together may provide certain network service. When one VNF has a failure, a corresponding alarm may be generated.

The alarm correlation and root alarm location module is located on a VNFM and is arranged to execute the alarm correlation and root alarm location function.

VNFs here may be from different manufacturers.

Corresponding to this device, the alarm correlation and root alarm location process may be arranged to execute the following acts.

When a VNF has a failure, an alarm is reported to the VNFM, the reported alarm information containing the VNFFGR ID information of a VNF FG containing the VNF and the position information of the VNF in the VNF FG (for example, the sequence number of the VNF in the VNF FG).

The alarm correlation and root alarm location module located on the VNFM performs correlation analysis on the received alarm.

The VNFFGR ID information of the VNF FG containing the VNF reporting the alarm and the position information of the VNF in the VNF FG are acquired from the alarm information.

According to the VNFFGR ID information of the VNF FG containing the VNF, it is judged whether a same type alarm or a function related alarm reported by other VNFs in the VNF FG has been received.

If other alarms have not been received yet, the alarm is temporarily determined to be a primary alarm. If other alarms have been received, the position of the VNF reporting the alarm in the VNF FG is compared with the position of the VNF reporting the previously received alarm in the VNF FG.

If the position of the VNF reporting the alarm is prior to the position of the VNF reporting the previously received alarm, it is indicated the received alarm to be a root alarm, the alarm is marked as a root alarm and the previously received alarm is marked as a secondary alarm.

If the position of the VNF reporting the alarm is after the position of the VNF reporting the previously received alarm, it is indicated that the alarm is not a root alarm, the alarm is marked as a secondary alarm, and the mark of the previously received alarm is kept unchanged.

The VNFM changes the display mode of related alarms according to the analysis result.

The VNFM is suggested to have a storage space to cache all the received alarms. If a previously received alarm is marked as a root alarm, after a time interval passes since the alarm is received, if the root alarm mark has not been changed because of the reporting of other alarms, the alarm is reported to the upper-layer network management system.

Fourth Exemplary Embodiment

Figure 8:
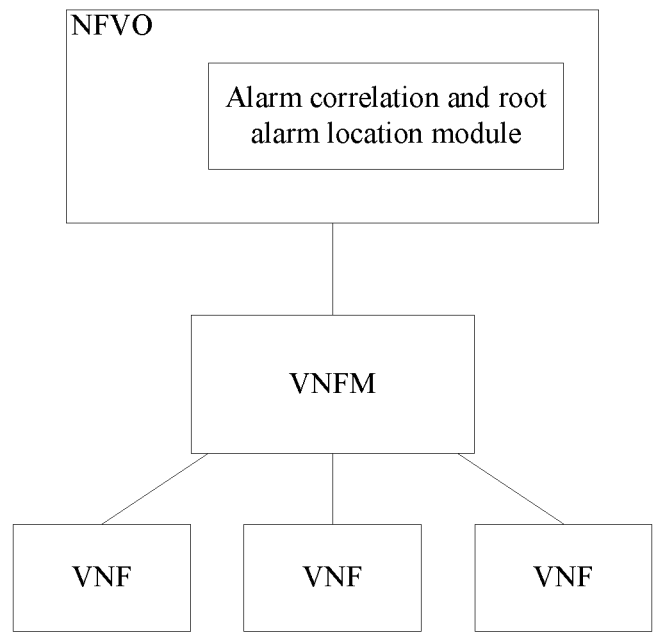
FIG. 8 is a structure diagram of an alarm correlation and root alarm location device according to a fourth exemplary embodiment of the present disclosure.

FIG. 8 is a structure diagram of an alarm correlation and root alarm location device according to a fourth exemplary embodiment of the present disclosure. As shown in FIG. 8, the structure may include one or more VNFs, a VNFM and an alarm correlation and root alarm location module.

One or more VNFs together may provide certain network service. When one VNF has a failure, a corresponding alarm may be generated.

The VNFM manages the life period of the VNF, and forwards the alarm reported by the managed VNF to an NFVO.

The alarm correlation and root alarm location module is located on the NFVO and is arranged to execute the alarm correlation and root alarm location function.

VNFs here may be from different manufacturers.

Corresponding to this device, the specific process of the alarm correlation and root alarm location process may be arranged to execute the following acts.

When a VNF has a failure, an alarm is reported to the NFVO through the VNFM, the reported alarm information containing the network_forwarding_path ID information of a Network Forwarding Graph (NFG) containing the VNF and the position of the VNF on the NFG (for example, the sequence number of the VNF on the NFG).

The alarm correlation and root alarm location module located on the NFVO performs correlation analysis on the received alarm.

The network_forwarding_path ID information of the NFG containing the VNF reporting the alarm and the position information of the VNF on the NFG are acquired from the alarm information.

According to the network_forwarding_path ID information of the NFG containing the VNF, it is judged whether a same type alarm or a function related alarm reported by other VNFs on the NFG has been received.

If other alarms have not been received yet, the alarm is temporarily determined to be a primary alarm. If other alarms have been received, the position of the VNF reporting the alarm in the NFG is compared with the position of the VNF reporting the previously received primary alarm in the NFG.

If the position of the VNF reporting the alarm is prior to the position of the VNF reporting the previously received alarm, it is indicated that the alarm is a primary alarm, the alarm is marked as a primary alarm and the previously received alarm is marked as a secondary alarm.

If the position of the VNF reporting the alarm is after the position of the VNF reporting the previously received alarm, it is indicated that the alarm is not a primary alarm, and the alarm is marked as a secondary alarm.

If needed, the NFVO may change the display mode of related alarms according to the analysis result.

If the received alarm is marked as a primary alarm, after a time interval passes since the alarm is received, if the primary alarm mark has not been changed because of the reporting of other alarms, the alarm is marked as a root alarm, then the NFVO may forward the alarm to the OSS, or start a related alarm troubleshooting process to trouble shoot the alarm or start a corresponding vertical correlation analysis process.

Fifth Exemplary Embodiment

As shown in FIG. 8, the structure may include one or more VNFs, a VNFM and an alarm correlation and root alarm location module.

One or more VNFs together may provide certain network service. When one VNF has a failure, a corresponding alarm may be generated.

The VNFM manages the life period of the VNF, and forwards the alarm reported by the managed VNF to an NFVO.

The alarm correlation and root alarm location module is located on the NFVO and is arranged to execute the alarm correlation and root alarm location function.

VNFs here may be from different manufacturers.

Corresponding to this device, the alarm correlation and root alarm location process may be arranged to execute the following acts.

When a VNF has a failure, an alarm is reported to the NFVO through the VNFM, the NFVO finds the corresponding VNF according to the received alarm information (this process probably needs to perform correlation processing between alarm and VNF first, this function is not included in the scope of the present disclosure).

The alarm correlation and root alarm location module located on the NFVO performs correlation analysis on the received alarm.

Corresponding parent_ns is found according to the VNF Record (VNFR) of the VNF corresponding to the above alarm.

Corresponding Network Service Record (NSR) is found according to the parent_ns.

Finally a VNF Forwarding Graph list corresponding to the above VNF is found according to the VNFFGR parameter in the Network Service Record (NSR). Then it is judged whether a same type alarm or a function related alarm reported by other VNFs on the VNF Forwarding Graph in the VNF Forwarding Graph list has been received.

If other alarms have not been received yet, the alarm is temporarily determined to be a primary alarm. If other alarms have been received, the position of the VNF reporting the alarm in the VNF FG is compared with the position of the VNF reporting the previously received alarm in the VNF FG.

If the position of the VNF reporting the alarm is prior to the position of the VNF reporting the previously received alarm, it is indicated that the alarm is a primary alarm, the alarm is marked as a primary alarm and the previously received alarm is marked as a secondary alarm.

If the position of the VNF reporting the alarm is after the position of the VNF reporting the previously received alarm, it is indicated that the alarm is not a primary alarm, and the alarm is marked as a secondary alarm.

If needed, the NFVO may change the display mode of related alarms according to the analysis result.

If the received alarm is marked as a primary alarm, after a time interval passes since the alarm is received, if the primary alarm mark has not been changed because of the reporting of other alarms, the alarm is marked as a root alarm, then the NFVO may forward the alarm to the OSS, or start a related alarm troubleshooting process to trouble shoot the alarm or start a corresponding vertical correlation analysis process.

Sixth Exemplary Embodiment

Figure 9:
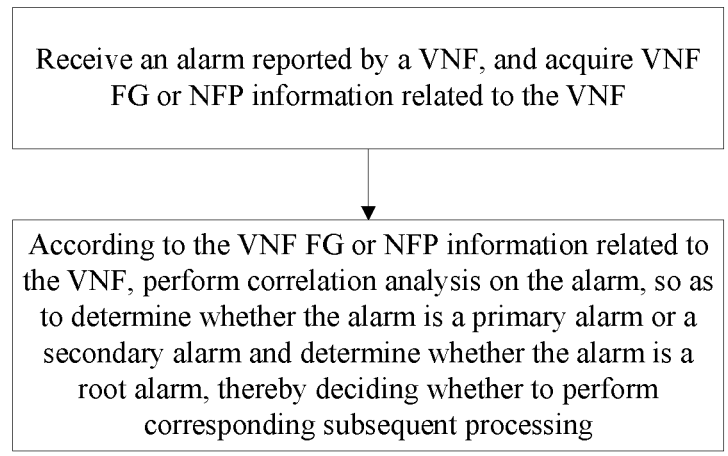
FIG. 9 is a flowchart of alarm correlation according to a sixth exemplary embodiment of the present disclosure.

FIG. 9 is a flowchart of alarm correlation according to a sixth exemplary embodiment of the present disclosure. As shown in FIG. 9, the process may include the following acts.

At act S502, an alarm reported by a VNF is received, and VNF FG or NFP information related to the VNF is acquired.

At act S504, according to the VNF FG or NFP information related to the VNF, correlation analysis is performed on the alarm, so as to determine whether the alarm is a primary alarm or a secondary alarm and determine whether the alarm is a root alarm, thereby deciding whether to perform corresponding subsequent processing.

Seventh Exemplary Embodiment

Figure 10:
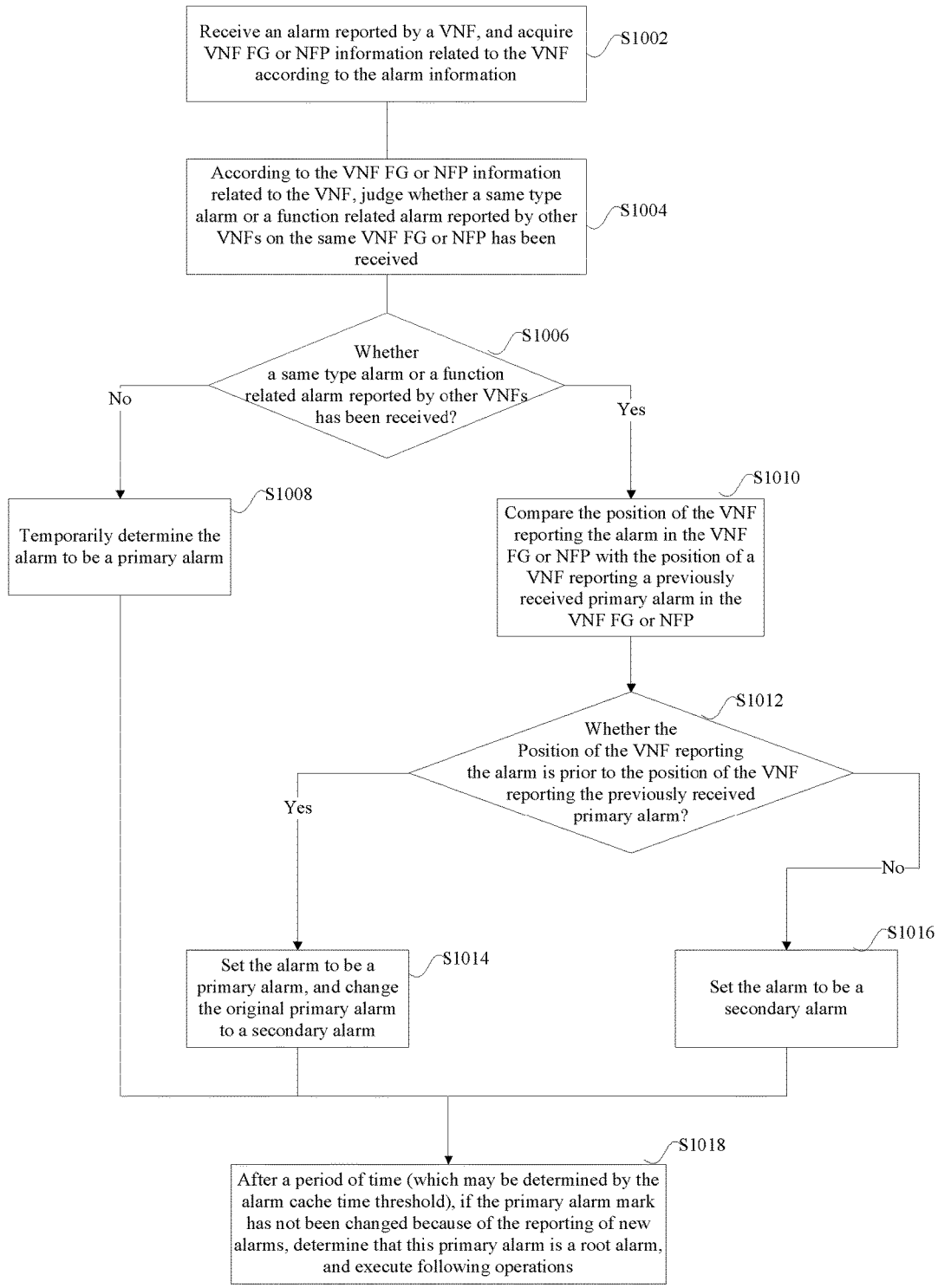
FIG. 10 is a flowchart of an alarm correlation method according to a seventh exemplary embodiment of the present disclosure.

FIG. 10 is a flowchart of an alarm correlation method according to a seventh exemplary embodiment of the present disclosure. As shown in FIG. 10, the process may include the following acts.

At act S1002, an alarm reported by a VNF is received, and VNF FG or NFP information related to the VNF is acquired.

At act S1004, according to the VNF FG or NFP information related to the VNF, it is judged whether a same type alarm or a function related alarm reported by other VNFs on the same VNF FG or NFP has been received.

At act S1006, it is judged whether a same type alarm or a function related alarm reported by other VNFs has been received. When the judgement result is negative, the flow proceeds to S1008; otherwise, the flow proceeds to S1010.

At act S1008, the alarm is temporarily determined to be a primary alarm, and the flow proceeds to S1018.

At act S1010, the position of the VNF reporting the alarm in the VNF FG or NFP is compared with the position of a VNF reporting a previously received primary alarm in the VNF FG or NFP.

At act S1012, it is judged whether the position of the VNF reporting the alarm is prior to the position of the VNF reporting the previously received primary alarm. When the judgement result is positive, the flow proceeds to S1014; otherwise, the flow proceeds to S1016.

At act S1014, the alarm is set to be a primary alarm, and the original primary alarm is changed to a secondary alarm.

At act S1016, the alarm is set to be a secondary alarm.

At act S1018, after a period of time (which may be determined by the alarm cache time threshold), if the primary alarm mark has not been changed because of the reporting of new alarms, it is determined that this primary alarm is a root alarm, and then subsequent operations are executed.

Obviously, those skilled in the art should understand that the modules or acts described above can be implemented by a common computer device; the modules or acts can be integrated on a single computing device or distributed on a network composed of a plurality of computing devices; optionally, the modules or acts can be implemented by a programming code executable by a computing device, thus they can be stored in a storage device to be executed by a computing device and executed in a different order in some cases, or manufactured into individual integrated circuit module respectively, or several of them can be manufactured into a single integrated circuit module to implement; in this way, the present disclosure is not limited to any combination of specific hardware and software.

The above are only the exemplary embodiments of the present disclosure and not intended to limit the present disclosure. For those skilled in the art, various modifications and changes can be made to the present disclosure. Any modification, equivalent substitute and improvement made within the principle of the present disclosure are intended to be included within the scope of protection defined by the appended claims of the present disclosure.

INDUSTRIAL APPLICABILITY

As described above, through the above embodiments and exemplary embodiments, the problems of low alarm analysis efficiency and slow fault location in the related methods for alarm correlation are solved, and the effects of improving alarm analysis efficiency and fast fault location are achieved.

What is claimed is:

1. An alarm processing method, comprising:
  receiving an alarm reported by a Virtualized Network Function (VNF);
  acquiring VNF Forwarding Graph (VNF FG) information of the VNF and/or Network Forwarding Path (NFP) information of the VNF; and
  performing alarm analysis processing on the received alarm according to the VNF FG information and/or the NFP information acquired, wherein performing alarm analysis processing on the received alarm according to the VNF FG information and/or the NFP information acquired comprises at least one of:
  judging whether an alarm, of which a type is the same as the received alarm and which is reported by one or more other VNFs in the VNF FG except the VNF, is received, and when no alarm, of which the type is the same as the received alarm and which is reported by one or more other VNFs in the VNF FG except the VNF, is received, determining the received alarm to be a primary alarm;
  comparing a position of the VNF, which reports the received alarm, in the VNF-FG with a position of a VNF, which reports a previously received primary alarm, in the VNF-FG, and when the position of the VNF, which reports the received alarm, in the VNF-FG is prior to the position of the VNF, which reports the previously received primary alarm, in the VNF-FG, determining the received alarm to be a primary alarm;
  comparing a position of the VNF, which reports the received alarm, in the VNF-FG with a position of a VNF, which reports a previously received primary alarm, in the VNF-FG, and when the position of the VNF, which reports the received alarm, in the VNF-FG is after the position of the VNF, which reports the previously received primary alarm, in the VNF-FG, determining the received alarm to be a secondary alarm;
  judging whether an alarm, of which a type is the same as the received alarm serving as a primary alarm, is received with a preset time, and when no alarm, of which the type is the same as the received alarm serving as the primary alarm, is received with the preset time, determining the received alarm to be a root alarm;
  judging whether an alarm, of which a type is the same as the received alarm and which is reported by one or more other VNFs in the NFP except the VNF, is received, and when no alarm, of which the type is the same as the received alarm and which is reported by one or more other VNFs in the NFP except the VNF, is received, determining the received alarm to be a primary alarm;
  comparing a position of the VNF, which reports the received alarm, in the NFP with a position of a VNF, which reports a previously received primary alarm, in the NFP, and when the position of the VNF, which reports the received alarm, in the NFP is prior to the position of the VNF, which reports the previously received primary alarm, in the NFP, determining the received alarm to be a primary alarm;
  comparing a position of the VNF, which reports the received alarm, in the NFP with a position of a VNF, which reports a previously received primary alarm, in the NFP, and when the position of the VNF, which reports the received alarm, in the NFP is after the position of the VNF, which reports the previously received primary alarm, in the NFP, determining the received alarm to be a secondary alarm; and
  judging whether an alarm, of which a type is the same as the received alarm serving as a primary alarm, is received with a preset time, and when no alarm, of which the type is the same as the received alarm serving as the primary alarm, is received with the preset time, determining the received alarm to be a root alarm.

2. The method as claimed in claim 1, wherein the VNF FG information and/or the NFP information is acquired through at least one of:
  acquiring the VNF FG information and/or the NFP information from an Operation Supporting System (OSS);
  acquiring the VNF FG information and/or the NFP information from a Network Management System (NMS);
  acquiring the VNF FG information and/or the NFP information from a Network Function Virtualization Orchestrator (NFVO); or
  acquiring the VNF FG information and/or the NFP information from the received alarm.

3. The method as claimed in claim 2, wherein after performing alarm analysis processing on the received alarm according to the VNF FG information and/or the NFP information acquired, when the received alarm is determined to be a root alarm, the alarm processing method further comprises processing the alarm by at least one of:
  reporting the alarm;
  displaying the alarm by a preset way;
  starting a related troubleshooting process; and
  adding the alarm to a vertical alarm correlation process.

4. The method as claimed in claim 1, wherein the VNF FG information comprises at least one of: a VNF Forwarding Graph Record Identifier (VNFFGR ID) of a VNF FG containing the VNF; or a position of the VNF in the VNF FG;

the NFP information comprises at least one of: a Network Forwarding Path Identifier (NFP ID) of an NFP containing the VNF; or a position of the VNF in the NFP.

5. The method as claimed in claim 4, wherein after performing alarm analysis processing on the received alarm according to the VNF FG information and/or the NFP information acquired, when the received alarm is determined to be a root alarm, the alarm processing method further comprises processing the alarm by at least one of:
   reporting the alarm;
   displaying the alarm by a preset way;
   starting a related troubleshooting process; and
   adding the alarm to a vertical alarm correlation process.

6. The method as claimed in claim 1, wherein after performing alarm analysis processing on the received alarm according to the VNF FG information and/or the NFP information acquired, when the received alarm is determined to be a root alarm, the alarm processing method further comprises processing the alarm by at least one of:
   reporting the alarm;
   displaying the alarm by a preset way;
   starting a related troubleshooting process; and
   adding the alarm to a vertical alarm correlation process.

7. The method as claimed in claim 1, wherein performing alarm analysis processing on the received alarm according to the VNF FG information and/or the NFP information acquired further comprises at least one of:
   judging whether a function related alarm reported by one or more other VNFs in the VNF FG except the VNF is received, and when no alarm, of which the type is the same as the received alarm and which is reported by one or more other VNFs in the VNF FG except the VNF, is received, determining the received alarm to be a primary alarm;
   judging whether a function related alarm of the received alarm serving as a primary alarm, is received with a preset time, and when no alarm, of which the type is the same as the received alarm serving as the primary alarm, is received with the preset time, determining the received alarm to be a root alarm;
   judging whether a function related alarm reported by one or more other VNFs in the NFP except the VNF, is received, and when no alarm, of which the type is the same as the received alarm and which is reported by one or more other VNFs in the NFP except the VNF, is received, determining the received alarm to be a primary alarm; and
   judging whether a function related alarm of the received alarm serving as a primary alarm, is received with a preset time, and when no alarm, of which the type is the same as the received alarm serving as the primary alarm, is received with the preset time, determining the received alarm to be a root alarm.

8. The method as claimed in claim 7, wherein judging whether a function related alarm reported by one or more other VNFs in the VNF FG except the VNF is received comprises:
   according to a VNF Forwarding Graph Record Identifier, VNFFGR ID, of a VNF FG containing the VNF or a Network Forwarding Path Identifier, NFP ID, of an NFP containing the VNF, judging whether a function related alarm reported by one or more other VNFs in the VNF FG except the VNF is received.

9. The method as claimed in claim 4, wherein judging whether an alarm, of which a type is the same as the received alarm and which is reported by one or more other VNFs in the VNF FG or NFP except the VNF comprises:
   according to a VNF Forwarding Graph Record Identifier, VNFFGR ID, of a VNF FG containing the VNF or a Network Forwarding Path Identifier, NFP ID, of an NFP containing the VNF, judging whether an alarm, of which a type is the same as the received alarm and which is reported by one or more other VNFs in the VNF FG except the VNF.

10. The method as claimed in claim 4, wherein after performing alarm analysis processing on the received alarm according to the VNF FG information and/or the NFP information acquired, when the received alarm is determined to be a root alarm, the alarm processing method further comprises processing the alarm by at least one of:
    reporting the alarm;
    displaying the alarm by a preset way;
    starting a related troubleshooting process; and
    adding the alarm to a vertical alarm correlation process.

11. A non-transitory storage medium, in which a programming code is stored, wherein the programming code, when being executed by a computing device, causes the computing device to execute the method as claimed claim 1.

12. An alarm processing apparatus, comprising a hardware processor arranged to execute program modules comprising:
    a receiving module, which is arranged to receive an alarm reported by a Virtualized Network Function (VNF);
    an acquisition module, which is arranged to acquire VNF Forwarding Graph (VNF FG) information of the VNF and/or Network Forwarding Path (NFP) information of the VNF; and
    a first processing module, which is arranged to perform alarm analysis processing on the received alarm according to the VNF FG information and/or the NFP information acquired, wherein the first processing module comprises at least one of:
    a first determination unit, which is arranged to judge whether an alarm, of which a type is the same as the received alarm and which is reported by one or more other VNFs in the VNF FG except the VNF, is received, and when no alarm, of which the type is the same as the received alarm and which is reported by one or more other VNFs in the VNF FG except the VNF, is received, determine the received alarm to be a primary alarm;
    a second determination unit, which is arranged to compare a position of the VNF, which reports the received alarm, in the VNF-FG with a position of a VNF, which reports a previously received primary alarm, in the VNF-FG, and when the position of the VNF, which reports the received alarm, in the VNF-FG is prior to the position of the VNF, which reports the previously received primary alarm, in the VNF-FG, determine the received alarm to be a primary alarm;
    a third determination unit, which is arranged to compare a position of the VNF, which reports the received alarm, in the VNF-FG with a position of a VNF, which reports a previously received primary alarm, in the VNF-FG, and when the position of the VNF, which reports the received alarm, in the VNF-FG is after the position of the VNF, which reports the previously received primary alarm, in the VNF-FG, determine the received alarm to be a secondary alarm;
    a fourth determination unit, which is arranged to judge whether an alarm, of which a type is the same as the received alarm serving as a primary alarm, is received with a preset time, and when no alarm, of which the type is the same as the received alarm serving as the primary alarm, is received with the preset time, determine the received alarm to be a root alarm;

a fifth determination unit, which is arranged to judge whether an alarm, of which a type is the same as the received alarm and which is reported by one or more other VNFs in the NFP except the VNF, is received, and when no alarm, of which the type is the same as the received alarm and which is reported by one or more other VNFs in the NFP except the VNF, is received, determine the received alarm to be a primary alarm;

a sixth determination unit, which is arranged to compare a position of the VNF, which reports the received alarm, in the NFP with a position of a VNF, which reports a previously received primary alarm, in the NFP, and when the position of the VNF, which reports the received alarm, in the NFP is prior to the position of the VNF, which reports the previously received primary alarm, in the NFP, determine the received alarm to be a primary alarm;

a seventh determination unit, which is arranged to compare a position of the VNF, which reports the received alarm, in the NFP with a position of a VNF, which reports a previously received primary alarm, in the NFP, and when the position of the VNF, which reports the received alarm, in the NFP is after the position of the VNF, which reports the previously received primary alarm, in the NFP, determine the received alarm to be a secondary alarm; and an eighth determination unit, which is arranged to judge whether an alarm, of which a type is the same as the received alarm serving as a primary alarm, is received with a preset time, and when no alarm, of which the type is the same as the received alarm serving as the primary alarm, is received with the preset time, determine the received alarm to be a root alarm.

13. The apparatus as claimed in claim 12, wherein the acquisition module is further arranged to acquire the VNF FG information and/or the NFP information through at least one of:
   acquiring the VNF FG information and/or the NFP information from an Operation Supporting System (OSS);
   acquiring the VNF FG information and/or the NFP information from a Network Management System (NMS);
   acquiring the VNF FG information and/or the NFP information from a Network Function Virtualization Orchestrator (NFVO); and
   acquiring the VNF FG information and/or the NFP information from the received alarm.

14. The apparatus as claimed in claim 13, wherein the hardware processor is arranged to execute program modules comprising: a second processing module, which is arranged to process the received alarm which is determined to be a root alarm by at least one of:
   reporting the alarm;
   displaying the alarm by a preset way;
   starting a related troubleshooting process; and
   adding the alarm to a vertical alarm correlation process.

15. The apparatus as claimed in claim 12, wherein the VNF FG information comprises at least one of: a VNF Forwarding Graph Record Identifier (VNFFGR ID) of a VNF FG containing the VNF; or a position of the VNF in the VNF FG;
   the NFP information comprises at least one of: a Network Forwarding Path Identifier (NFP ID) of an NFP containing the VNF; or a position of the VNF in the NFP.

16. The apparatus as claimed in claim 15, wherein the hardware processor is arranged to execute program modules comprising: a second processing module, which is arranged to process the received alarm which is determined to be a root alarm by at least one of:
   reporting the alarm;
   displaying the alarm by a preset way;
   starting a related troubleshooting process; and
   adding the alarm to a vertical alarm correlation process.

17. The apparatus as claimed in claim 12, wherein the hardware processor is arranged to execute program modules comprising: a second processing module, which is arranged to process the received alarm which is determined to be a root alarm by at least one of:
   reporting the alarm;
   displaying the alarm by a preset way;
   starting a related troubleshooting process; and
   adding the alarm to a vertical alarm correlation process.

18. The apparatus as claimed in claim 9, wherein the hardware processor is arranged to execute program modules comprising: a second processing module, which is arranged to process the received alarm which is determined to be a root alarm by at least one of:
   reporting the alarm;
   displaying the alarm by a preset way;
   starting a related troubleshooting process; and
   adding the alarm to a vertical alarm correlation process.

* * * * *